J. B. Lyon,

Glass Mold.

No. 110,056. Patented Dec. 13, 1870.

Inventor:
James B. Lyon,
by Bakewell & Christy his Att'ys.

Witnesses:
R. C. Walmshaw
E. E. Fitler

United States Patent Office.

JAMES B. LYON, OF PITTSBURG, PENNSYLVANIA.

Letters Patent No. 110,056, dated December 13, 1870.

IMPROVEMENT IN MOLDS FOR MAKING GLASS WARE.

The Schedule referred to in these Letters Patent and making part of the same.

*To all whom it may concern:*

Be it known that I, JAMES B. LYON, of the city of Pittsburg, in the county of Allegheny and State of Pennsylvania, have invented a new and useful Improvement in Molds for Making Glass Ware; and I do hereby declare the following to be a full, clear, and exact description thereof, reference being had to the accompanying drawing making a part of this specification, in which—

Like letters of reference indicate like parts in each.

Heretofore two-part molds for the manufacture of glass ware have been connected together by a hinge, but the objection to this sort of connection is that the joint between the two parts cannot be made tight enough to prevent a large fin being formed on the article pressed.

To enable others skilled in the art to make and use my invention, I will describe its construction and mode of operation.

On a bed-plate, $a$, between two side pieces or ways, $b$, I place a sliding frame, $c$, which carries at its back end one-half, $d$, of a two-part mold.

The other or forward end of the frame $c$ carries an eccentric shaft, $e$, which is secured in place by caps $f$.

On the shaft $e$ is an eccentric, $g$, which operates, when in motion, against a yoke, $h$, said yoke being fastened to the forward half $d'$ of the two-part mold.

The eccentric $g$ is operated by a crank, which is placed on the end $e'$ of the shaft $e$, and works against the face of the forward half $d'$ of the two-part mold, and against the yoke $h$.

The parts of the mold are guided and steadied in their forward and back motion by a tongue-and-groove joint in one side of the sliding frame $c$, the groove $k$ being in the frame and the tongue in the side of the part $d'$.

Figure 1:
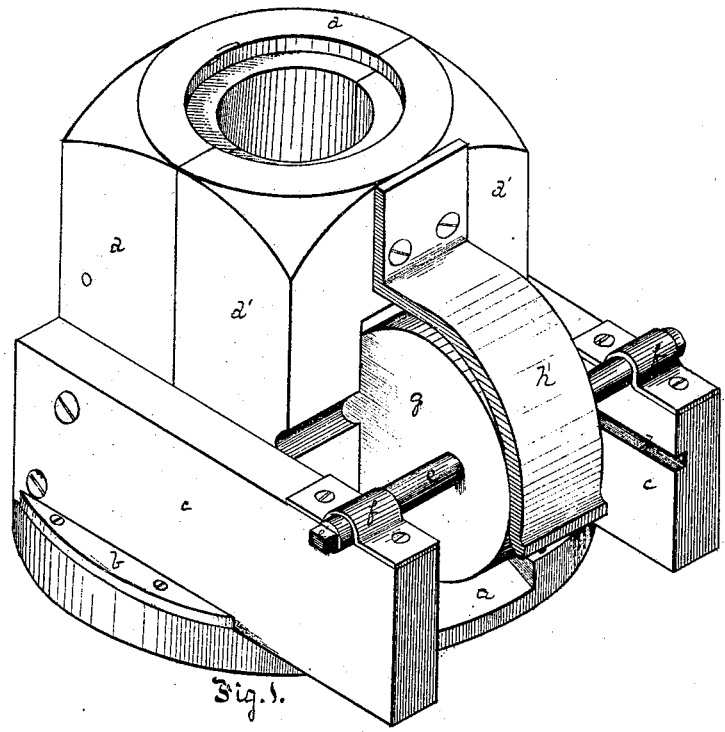
Figure 1 is a perspective view of my improved glass-mold when closed.
Figure 2:
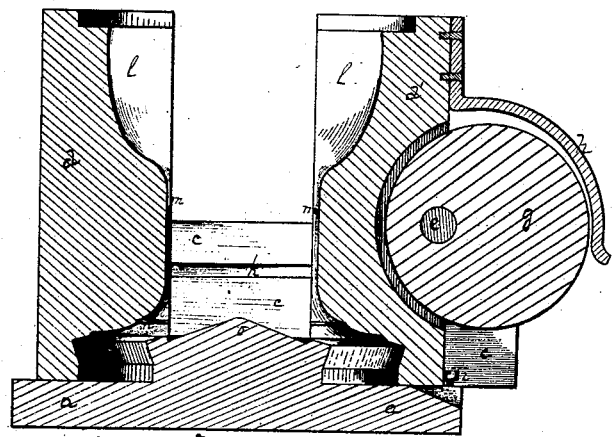
Figure 2 is a sectional view of the same, showing the operative parts and their position when the mold is open.

The operation is as follows:

The mold, being shut as shown in fig. 1, the glass to be pressed is placed in the cavity. A plunger of the desired shape then descends into the mold, and presses the glass into shape. Then the mold is opened by applying power to the cam-shaft $e$, the eccentric $g$ operating against the yoke $h$, drawing the part $d'$ forward until it encounters the peg or stop $i$, fig. 2. Since the part $d'$ cannot advance further forward, the eccentric $g$, still operating against the yoke $h$, pushes back the sliding frame, which carries back with it the part $d$ a distance equal to the distance the part $d'$ advanced. The mold is then open, (see fig. 2,) and the article of glass-ware may be removed.

To close the mold the operation described is reversed.

Just at the point where the two parts of the mold come together the eccentric $g$ presses against both the part $d'$ and the yoke $h$, and holds the two parts tightly together.

The mold shown is for forming a goblet. In the cavity $l$ the bowl is formed; the stem is formed in the long cavity $m$, and the top of the foot in the cavity $n$. Shape is given to the lower or under face of the foot by the foot-die $o$.

My invention can be applied to the manufacture of all articles of pressed glass-ware which have heretofore been made in two-part molds of the ordinary description.

The stop $i$ is placed at a distance from the point where the two parts, $d$ and $d'$, meet, equal to one-half the throw of the eccentric $g$.

In the manufacture of some articles it is desirable to have one of the parts of the mold stationary and the other operating against it. This may be accomplished by tightly securing one part to the bottom plate, and by making the eccentric to operate in connection with the other.

I do not limit myself to the manner shown of operating the mold. Instead of the eccentric any other equivalent or known way of imparting a reciprocating motion may be used.

What I claim as my invention, and desire to secure by Letters Patent, is—

1. A two-part mold for pressing glass ware, in which the two halves of the mold are arranged on sliding ways, or a bed or platform, and in opening and closing are caused to move directly to or from each other in straight lines.

2. An eccentric and yoke arranged in connection with each or either half of a two-part glass-mold, whereby such half of the mold shall be caused to open and close on the other half.

3. A sliding frame, carrying at one end one-half of a two part mold, and at the other end an eccentric shaft, which eccentric is arranged in connection with the other half of the mold, to open and close both.

4. The arrangement of an eccentric or cam, operative against one-half of a two-part mold, with connections therefrom to the opposite half, for the purpose of holding the two well together when the pressing is being done.

In testimony whereof, I, the said JAMES B. LYON, have hereunto set my hand.

JAMES B. LYON.

Witnesses:
    A. S. NICHOLSON,
    G. H. CHRISTY.